United States Patent
Michel

(10) Patent No.: US 10,536,051 B2
(45) Date of Patent: Jan. 14, 2020

(54) STATOR ASSEMBLY FOR WHEEL MOTOR AND STUB AXLE SUPPORT THEREFOR

(71) Applicant: Valeo Systemes de Controle Moteur, Cergy Saint Christophe (FR)

(72) Inventor: Luc Michel, Evecquemont (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 347 days.

(21) Appl. No.: 15/315,901

(22) PCT Filed: Jun. 5, 2015

(86) PCT No.: PCT/FR2015/051495
§ 371 (c)(1),
(2) Date: Dec. 2, 2016

(87) PCT Pub. No.: WO2015/185874
PCT Pub. Date: Dec. 10, 2015

(65) Prior Publication Data
US 2017/0110933 A1    Apr. 20, 2017

(30) Foreign Application Priority Data

Jun. 5, 2014 (FR) .................................... 14 55105

(51) Int. Cl.
*H02K 5/10* (2006.01)
*H02K 5/20* (2006.01)
(Continued)

(52) U.S. Cl.
CPC ............ *H02K 7/006* (2013.01); *B60K 7/0007* (2013.01); *B60L 3/0061* (2013.01); *H02K 1/187* (2013.01);
(Continued)

(58) Field of Classification Search
CPC .......... H02K 7/006; H02K 7/083; H02K 7/14; H02K 1/187; H02K 5/10; H02K 5/20;
(Continued)

(56) References Cited

U.S. PATENT DOCUMENTS 3,161,249 A  *  12/1964  Zuppiger ............. B60K 7/0007
                                                180/10
3,566,165 A  *   2/1971  Lohr .................... B60K 7/0007
                                                310/67 R
(Continued)

FOREIGN PATENT DOCUMENTS

CN       201204530 Y       3/2009
CN       201490802 U  *    5/2010
(Continued)

OTHER PUBLICATIONS

International Search Report issued in PCT/FR2015/051495, dated Aug. 5, 2015 (4 pages).
(Continued)

*Primary Examiner* — Bryan A Evans
(74) *Attorney, Agent, or Firm* — Osha Liang LLP

(57) ABSTRACT

Traction/braking device (50) for electric wheel motor comprising a stator assembly (2), a rotor (3), a braking system (4) with brake disc (45) rotating as one with the rotor, the stator assembly comprising a stub axle support (1), a stator body (21) and a cover (22) delimiting a stator cooling chamber (5), the stub axle support comprising a securing base (12) intended for connecting the traction/braking device (50) to the vehicle, the stub axle support (1) comprising three axial passages for two fluid pipes (14, 15) and one for the passage of cables (16), these three passages opening into a central zone (11) of the securing base.

12 Claims, 8 Drawing Sheets

US 10,536,051 B2

Page 2

(51) Int. Cl.
*H02K 9/19* (2006.01)
*B60K 11/02* (2006.01)
*B60K 7/00* (2006.01)
*H02K 7/00* (2006.01)
*H02K 1/18* (2006.01)
*H02K 5/22* (2006.01)
*H02K 7/08* (2006.01)
*H02K 7/14* (2006.01)
*B60L 3/00* (2019.01)
*B60K 1/00* (2006.01)
*B60T 1/06* (2006.01)

(52) U.S. Cl.
CPC .............. *H02K 5/10* (2013.01); *H02K 5/20* (2013.01); *H02K 5/225* (2013.01); *H02K 7/083* (2013.01); *H02K 7/14* (2013.01); *H02K 9/19* (2013.01); *B60K 11/02* (2013.01); *B60K 2001/006* (2013.01); *B60K 2007/0038* (2013.01); *B60K 2007/0092* (2013.01); *B60L 2220/14* (2013.01); *B60L 2220/16* (2013.01); *B60L 2220/44* (2013.01); *B60L 2220/50* (2013.01); *B60L 2240/445* (2013.01); *B60L 2270/145* (2013.01); *B60T 1/065* (2013.01); *Y02T 10/641* (2013.01)

(58) Field of Classification Search
CPC . H02K 5/225; H02K 9/19; H02K 1/00; B60K 7/0007; B60K 1/00; B60K 7/00; B60L 3/0061
See application file for complete search history.

(56) References Cited

U.S. PATENT DOCUMENTS

| 3,812,928 | A | * | 5/1974 | Rockwell | B60K 7/0007 180/65.51 |
|---|---|---|---|---|---|
| 3,932,076 | A | * | 1/1976 | Thibault | B60K 7/0015 418/177 |
| 4,913,258 | A | * | 4/1990 | Sakurai | B60K 7/0007 180/242 |
| 5,201,673 | A | * | 4/1993 | Minezawa | H01R 24/66 439/559 |
| 5,412,269 | A | * | 5/1995 | Couture | B60K 7/0007 310/67 R |
| 6,100,615 | A | * | 8/2000 | Birkestrand | B62K 23/04 180/65.51 |
| 7,744,031 | B2 | * | 6/2010 | Ng | B60R 22/46 242/390.8 |
| 8,013,482 | B2 | * | 9/2011 | Kurokawa | B60K 7/0007 310/54 |
| 8,459,386 | B2 | * | 6/2013 | Pickholz | B60K 7/0007 180/65.31 |
| 9,731,947 | B2 | * | 8/2017 | Yamamoto | B66F 9/07572 |
| 10,059,162 | B2 | * | 8/2018 | Matayoshi | B60K 7/00 |
| 2003/0159866 | A1 | * | 8/2003 | Claypole | B60G 3/18 180/65.51 |
| 2004/0080223 | A1 | * | 4/2004 | Shimizu | B60K 7/0007 310/75 C |
| 2005/0206250 | A1 | * | 9/2005 | Steffen | B60K 7/0007 310/59 |
| 2006/0096793 | A1 | * | 5/2006 | Akagi | A61G 5/045 180/65.1 |
| 2007/0188125 | A1 | * | 8/2007 | Shepard | B60K 6/46 318/778 |
| 2007/0257570 | A1 | * | 11/2007 | Walter | B60K 7/0007 310/67 R |
| 2009/0152055 | A1 | * | 6/2009 | Cox | F16D 65/827 188/71.6 |
| 2012/0132473 | A1 | * | 5/2012 | Weber | B60K 7/0007 180/58 |
| 2013/0099554 | A1 | | 4/2013 | Lee | |
| 2015/0137669 | A1 | * | 5/2015 | Lampic | B60K 7/0007 310/67 R |
| 2016/0068016 | A1 | * | 3/2016 | Winshtein | B60G 3/01 301/6.5 |
| 2017/0324297 | A1 | * | 11/2017 | Furuuchi | B60K 7/00 |
| 2018/0065469 | A1 | * | 3/2018 | Arrigoni | B60K 7/0007 |

FOREIGN PATENT DOCUMENTS

| CN | 201490802 U | 5/2010 |
|---|---|---|
| CN | 201813252 U | 4/2011 |
| CN | 102 673 380 A | 9/2012 |
| DE | 10 2005 055597 A1 | 5/2007 |
| EP | 0 337 032 A1 | 10/1989 |
| EP | 1 109 298 A1 | 6/2001 |
| FR | 2 988 066 A1 | 9/2013 |
| WO | 94/01917 A1 | 1/1994 |
| WO | 03/050498 A1 | 6/2003 |
| WO | 2007/043685 A1 | 4/2007 |
| WO | 2008/144517 A1 | 11/2008 |
| WO | 2010/101914 A1 | 9/2010 |
| WO | 2012/121629 A1 | 9/2012 |

OTHER PUBLICATIONS

Written Opinion of the International Searching Authority issued in PCT/FR2015/051495, dated Aug. 5, 2015 (6 pages).
Chinese Search Report in corresponding Chinese Application No. 2015800403999, dated Jul. 26, 2018 (3 pages).

* cited by examiner

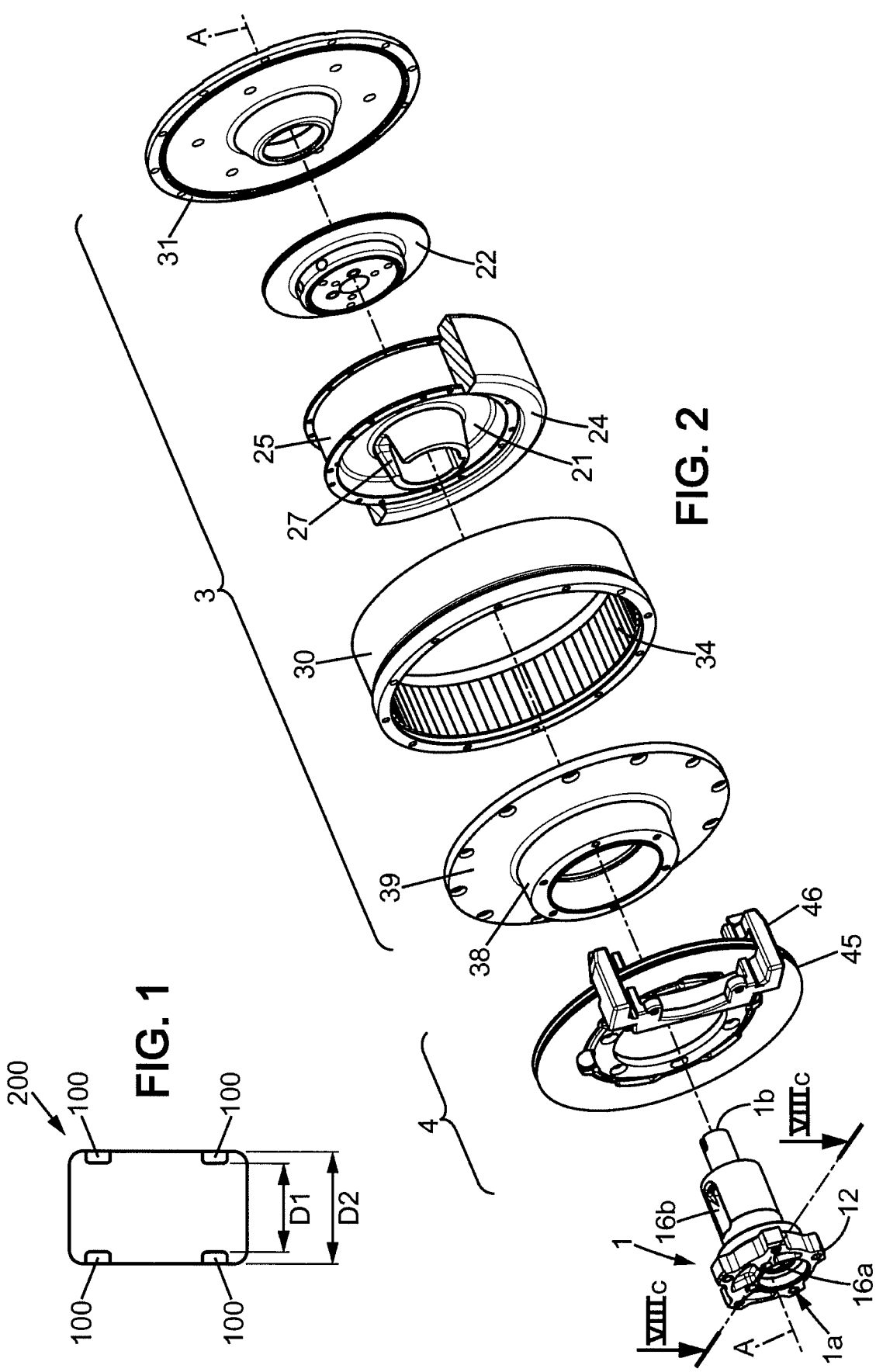

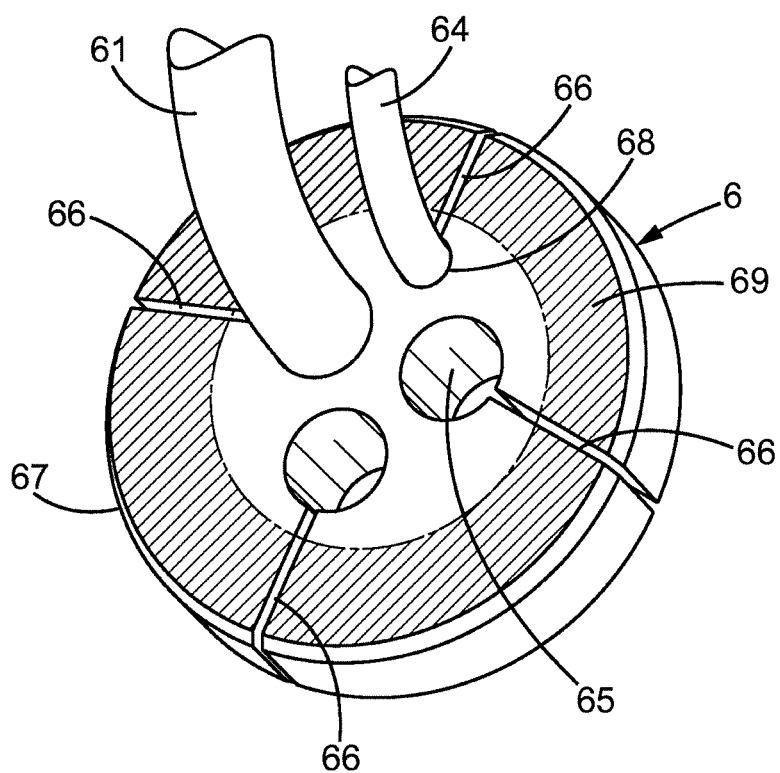

STATOR ASSEMBLY FOR WHEEL MOTOR AND STUB AXLE SUPPORT THEREFOR

The invention generally relates to traction-braking devices integrated into the wheels in an electrically driven vehicle, what is commonly referred to as a 'wheel motor'. More particularly, the invention relates to a stator assembly for wheel motor and its associated stub-axle support, intended to equip a particularly compact traction-braking device, housed in a vehicle wheel.

It is noted here that it may be a steering or non-steering wheel of the vehicle, and may also be connected to the vehicle by means of a suspension system, or rigidly.

A wheel motor of the present invention can equip, for example, a non-polluting delivery vehicle, a 100% electric commercial vehicle, any type of quadricycle, 100% electric tricycle, or electric two-wheeler. The invention can also be used in the context of a hybrid vehicle, one of the axles being driven in electric mode.

It is known, for example from document US2013099554, to arrange a traction-braking device housed at least partly in the inner space of a wheel rim. However, it is noted that the maximum possible size of the disk is limited by the passage of electrical cables above the disk.

A motorized wheel in which a liquid cooling device is located is also known, for example from WO01/54939; however, the central shaft is a rotating part, which involves having the fluid pipes at a position far from the axis. It is also noted that the braking device must be further provided on the inside of the vehicle.

A motorized wheel in which a liquid cooling device is located is also known, for example from EP1109298. But in this case also, the central shaft is a rotating part, which involves having the fluid pipes at a position far from the axis. It is also noted that the braking device also significantly extends toward the inside of the vehicle.

Consequently, there remains a need to provide a motorized wheel with an traction-braking device, the brake comprising a conventional disk brake system, the device being housed mainly inside the volume of a rim of a wheel of conventional size.

According to a first aspect, a stub-axle support is disclosed for a stator assembly intended for a traction-braking device for a motorized wheel of an electric vehicle, the stub-axle support having a securing base for connecting the traction-braking device to the vehicle, the stub-axle support being intended to rigidly support the stator assembly and rotationally support the rotor and the motorized wheel, the stub-axle support comprising at least three axial passages, for two fluid pipes and for the passage of cables, these three passages opening into a central zone of the securing base.

Thanks to these features, the stator assembly can be connected to the rest of the vehicle for the electrical control and liquid cooling functions, without interfering with the rotating parts, and without generating stresses on the dimensioning of the rotating parts. Such a solution for the stub-axle support allows for a geometric and architectural construction that promotes efficient integration into the volume of a wheel rim.

Advantageously, the three passages are distinct, so as to clearly separate the two liquid pipes and the passage of the cables.

Advantageously, the stub-axle support has a first seating for a first bearing, an intermediate seating to receive a stator body, a second seating for a second bearing, the diameters decreasing from the securing base to the free end opposite the securing base. Whereby the assembly from the end is facilitated, and this shape is optimized for the bending strength.

Advantageously, the passage of cables opens radially into a space adjacent to the body of the stator, such that the cables can be connected to the stator windings.

Advantageously, the passage of cables may open axially at the opposite end of the base, such that it is possible to install and supply a sine cosine type position sensor at the end of the stub-axle support.

Both axial passages for two pipes are formed by holes parallel to the main axis A of the stub-axle support.

Said holes may be through holes, which is an easy and cheap machining operation.

Said holes may be non-through holes, each hole bottom opening into a blind channel directed radially outwardly and preferably obtained by casting.

In a second aspect, a stator assembly is disclosed having a stub-axle support as described above, a stator body, and a cover defining an cooling chamber;

whereby, thanks to the axial passages in the stub-axle support, liquid fluid cooling of the stator is proposed that is compatible with the passage of the conducting cables that control the stator coils.

The stator comprises an annular element of coils, preferably arranged to be at an average axial position farthest from the base of stub-axle support that the average axial position of the bearing on the stub-axle support. In other words, the electromagnetic part of the stator is offset outwardly relative to the base, which allows the braking system to be to accommodated, notably including the brake disk and the corresponding caliper, and to secure them in the vicinity of the mounting flange of the stub-axle support.

The cover defining the cooling chamber is arranged on the outside of the stator body, i.e. on the side of the free end 13 of the stub-axle support; whereby, cooling performance of the stator equipment can be optimized; and the connections to the coils being located on the inside, the length of the electric control cables can be minimized.

The cover defining the cooling chamber is arranged on the inside of the stator body, i.e. axially arranged between the stator body and the securing base, such that the cover can be simpler to manufacture, and the connections to the coils being located on the outside, the bends in the cable routing can be less pronounced, which facilitates the cable installation and connection operations.

According to a third aspect, the invention relates to a traction-braking device having a stator assembly as described above, a rotor, a brake disk rotating as one with the rotor, the brake disk being arranged nearer to the attachment to the vehicle than the stator and the rotor, the brake disk being separated from the rotor by a space G available to accommodate at least brake caliper, whereby a motorized and braked wheel can be proposed in a very compact volume, using a standard brake caliper and thereby minimizing the cost.

Advantageously, the traction-braking device is confined within the interior volume of a 14-inch wheel rim. Whereby, the traction-braking device may be used for a wide variety of vehicles, utility vehicles, quadricycles, tricycles, etc., while having an electrical power up to 10 or 15 kW.

The rotor is formed as an assembly of a central cylindrical part bearing the permanent magnets, an outer disk on which the wheel rim can be mounted and an inner flanged disk on which the brake disk is mounted; this provides a simple assembly enabling the rotor to envelop the stator and be connected directly to the brake disk arranged on the inside relative to the stator, leaving an annular space required for the caliper; it also ensures a single and direct connection with the rim.

The interior space defined by the rotor is isolated from the external environment by seals; which makes it possible to avoid any pollution by the braking particles inside the traction-braking device.

According to a fourth aspect, a split seal is also disclosed forming a gland to seal the electrical cables and cooling pipes ('conductors') at the base of the stub-axle support. More precisely, a flexible seal is proposed (made of an elastomeric material, for example), having a general cylindrical shape of low height with a peripheral edge, the seal comprising through and cylindrical orifices coaxial with the general axis of the seal, each for a conductor (electric cable and/or fluid pipe), with a radial slot for each orifice connecting the passage orifice to the peripheral edge, the seal being received in a part forming a high receiving recess of lower height than the seal, the recess comprising a retaining edge adapted to cooperate with the peripheral edge of the seal, the receiving recess having a hollowed bottom opposite the orifices of the seal, and a closure part intended to be assembled on the recess forming part and to exert a pressure deforming the seal to clamp the conductors and/or to reduce the cross section of the orifices, to press on the edge and the bottom of the recess and close the radial slots, so as to provide a sealed passage.

According to these provisions, a seal forming a gland is obtained which allows for the radial disengagement of the conductors in the event of maintenance; furthermore, the pressurization of the seal is automatically ensured by assembling the elements of the closure part, without specific collar or other specific pressurizing device.

Optionally, the seal may have a first generally planar face and perpendicular to the general axis of the seal, a second face substantially planar and parallel to the first face; the interface with the recess and the closure part is thus particularly simple.

Optionally, the seal has a general wafer shape, with a peripheral edge of revolution; the seal is thus a particularly simple part to manufacture.

The following is a brief description of the drawings.

FIG. 1 is a general schematic view, seen from above, of a vehicle platform integrating a motorized wheel according to the present invention.

FIG. 2 is an exploded perspective view of the traction-braking device built into the motorized wheel.

FIG. 10 illustrates the split seal for cables.

What follows is a detailed description of several embodiments of the invention with examples and reference to the figures.

In the example shown, a vehicle 200 has four wheels 100, each being formed as a wheel motor equipped with a traction-braking device. In other configurations, one can of course use only two motorized wheels, the others being non-driving wheels. Regardless of the motorization, two or four of these wheels can be steered.

Furthermore, the wheels can be connected to the vehicle by a suspension system. As already stated, the motorized wheel described below can also be used in a vehicle having more than four wheels, a tricycle, or a two-wheeler.

In reference to FIG. 1, the overall external width is identified as D2 and the width between wheels (motorized) is identified as D1.

The aim is to maximize the ratio D1/D2, i.e. to provide the largest amount of available interior space for a restricted outside width. To a delivery vehicle, the cargo volume and the width D1 between wheel wells are key factors.

It should be noted that, as the motorization is housed in the wheels, there is no motorization member elsewhere in the vehicle and, except for the batteries, the driver's cab and some accessories, the remaining space in the body is made available for loading, which is advantageous.

Figure 3:
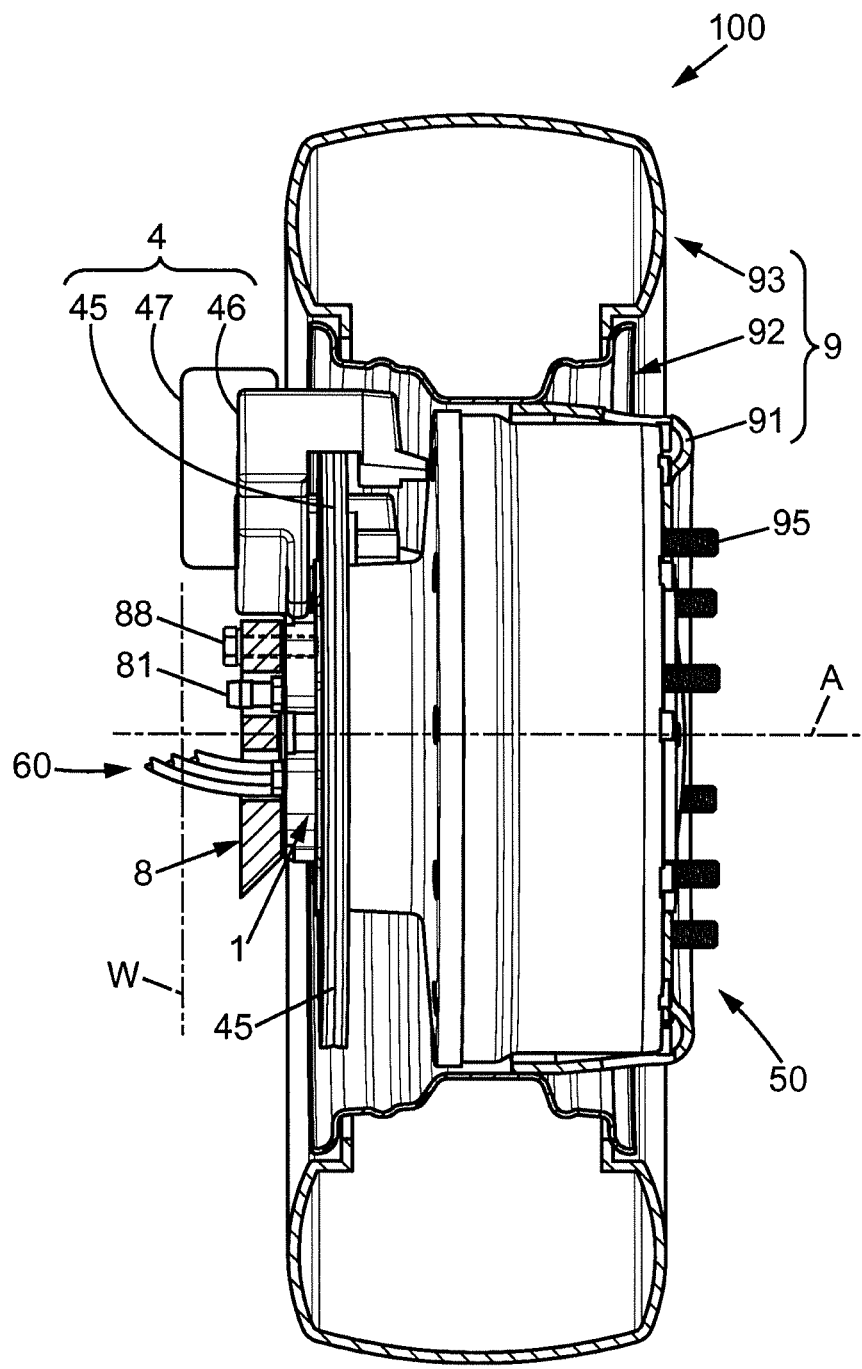
FIG. 3 is a front view of the traction-braking device.

In reference to FIG. 3, the motorized wheel 100 comprises a wheel 9, strictly speaking, comprising a tire 93 mounted on a standard rim 92 in a conventional manner and a rim disk 91 forming the central portion of the rim, with mounting holes for receiving bolts 95 projecting from the traction-braking device 50.

Traction-Braking Device

In reference to FIG. 2, the traction-braking device 50 comprises a stub-axle support 1 connected to the vehicle, a stator body 21, a cover 22 of stator, a rotor assembly 3 rotatably mounted on the stub-axle support around the stator, the axis of rotation, also referred to as the wheel axle, being identified as A.

It is an external rotor configuration, the rotor 3 being located radially outside the stator. A disk brake system 4 completes the configuration of the traction-braking device 50.

The stub-axle support 1 comprises a securing base 12, located at a first axial end 1a, and extends with a generally decreasing cross section towards a second axial end 1b. The stub-axle support 1 is a rugged and relatively massive metal element, that must bear some of the weight of the vehicle under both static and dynamic loading. The stub-axle support 1 is preferably monobloc as shown, but it is not excluded that it is built in 2 assembled parts.

Conventionally, for the remainder of the document, and in the absence of the "radial" or "radially" qualifier, elements located closest to the free end 1b of the stub-axle support will be designated as "exterior" or "outside" elements, and the elements located closest to the securing base 12, 1a of the stub-axle support will be designated as "interior" or "inside" elements. "Inwardly" designates an axial orientation defined as moving away from the free end 1b of the stub-axle support in the direction of the securing base 1a. "Outwardly" designates an axial orientation defined moving away from the securing base 12, 1a in the direction of the free end 1b of the stub-axle support.

As illustrated in FIGS. 2 to 6, the securing base 12 comprises five threaded holes 85 intended to secure the motorized wheel on an element referred to as the stub-axle 8 or strut 8, the latter being connected to the vehicle body, through a torsion bar suspension or spring, as necessary (outside the perimeter represented).

Bolts 88 are used to secure the stub-axle 8 and the securing base 12 of the stub-axle support 1 (FIG. 3). It should be noted that it is a cantilever mounting, the opposite free end 1b is not supported relative to the vehicle body.

Brake and Rotor

A brake disk 45 rotates as one with the rotor 3, the brake disk is arranged closer to the attachment to the vehicle than the stator 2 and the rotor 3, i.e. on the inside, the brake disk 45 being separated from the rotor 3 by a space G (FIG. 4) available to accommodate a standard brake caliper 47.

The brake caliper 47 is mounted on a support yoke 46 integral with the strut 8. Standard brake pads 48 are intended to be pressed against the disk 45 during braking, and to exert only a negligible force in the absence of hydraulic pressure. This kind of disk brake system with caliper and pad is chosen from among standard market components; it is known per se and will not be detailed here. The disk 45 is bolted to the rotor by countersunk screws 49 in a known manner.

It is noted that the diameter identified as R1, wherein the securing base of the stub-axle support 1 is contained, is less than the interior radial diameter of the disk 45. Furthermore, R2 is the outer radial diameter of the disk.

In the configuration of the invention, the ratio R1/R2 is maximized to accommodate a sufficiently robust base 12 at the center of the central recess of the brake disk 45, while using a disk brake system 4 with standard market caliper.

In the example shown, the rotor 3 is formed as an assembly of a central cylindrical portion 30 bearing permanent magnets 34 (North-South alternation), an outer disk 31 on which the wheel rim 91, 92 can be secured and an inner disk 39 with neck 38 on which the brake disk 45 is secured.

Stator

On the stator side, the stator assembly 2 comprises the stub-axle support 1 already mentioned, a stator body 21, securely attached to the stub-axle support 1 and a cover 22, attached to the body of the stator 21 and delimiting, with the body of the stator, a cooling chamber 5 which will be described in detail below. The body of the stator 21 includes an internal cylindrical bearing 20 centered on the axis A, intended to be mounted with no substantial play on a bearing surface 18 of the stub-axle support 1. The body of the stator 21 receives an annular element of stator coils 24 in a wide annular groove 25 defined by a inner edge 25a and an outer edge 25b. The annular stator element can typically comprise a series of coils, in the circumferential direction, that form electromagnetic poles. For example, it may be a synchronous three-phase motor with a series of poles U, V, W as known per se.

The plurality of coils are controlled by a computer (not shown) intended to control the torque generated by the electric motor formed by the stator+rotor assembly. As the control computer is housed outside the wheel, an electrical connection is required between the wheel itself and the rest of the vehicle.

The electric motor of the traction-braking device 50 supplies a traction torque, and it is also used for the regenerative braking function. The electrical power is several kilowatts and effective cooling is consequently required in certain unfavorable operating conditions. In urban 'stop-and-go' type conditions, the motor is solicited as both a motor and a generator, and also the braking system 4, and it turns out that air cooling is insufficient. The solution adopted is consequently liquid cooling, wherein calories are discharged away from the traction-braking device itself. It is a matter of cooling the stator, particularly the coil element wherein a thermal dissipation occurs by means of a liquid flow which comprises a first pipe that brings the fresh liquid from the vehicle and a second pipe through which the coolant returns to the vehicle.

Consequently, three connections must be established between the stator element and the vehicle, and according to the invention, these three connections are established through the stub-axle support, two hydraulic connections and an electrical connection, the latter may include several single electrical conductors.

The stub-axle support thus includes three axial passages, two for hydraulic fluid lines 14, 15, one 'supply' 14 and another 'return' 15, and a third passage 16 for routing the electrical cables 60.

At the securing base 12 on the strut 8, these three passages open into a central zone 11 of the securing base 12, some distance from rotating parts (disk, rim). The three axial passages are advantageously distributed in the vicinity of the axis A according to a generally triangular arrangement, the third passage 16 having dimensions larger than the first two 14, 15.

In the case where the wheel in question is a steering wheel, advantageously according to the present invention, it is possible to position the steering pivot axis W of the wheel in close immediate proximity to the interface plane P of the base 12, with a view to optimize the ratio D1/D2 already mentioned. Furthermore, the pivot axis W is preferably placed a short distance from the wheel axis A (even intersecting), so that during rotational movement of the steering (around W), there is no traction on the electrical cables and hydraulic lines, but a simple hinge effect.

Of course, it should be noted that there may be more than three passages.

As far as the passage for the cables is concerned, it extends from the mouth 16a on the attachment vehicle side to the free end, it opens at an outlet 16b opening radially outwardly in the vicinity of body of the stator 21, so that the control cables can connect with the various coils of the coil element 24. In the example shown, the outlet 16b opens on the inside with respect to the body of the stator 21 and thus the coils are connected by the cables on the inside of the annular element of coils 24.

In addition, optionally, it can also open at the axial end 1b of the stub-axle support by an end opening 13.

Figure 8A:
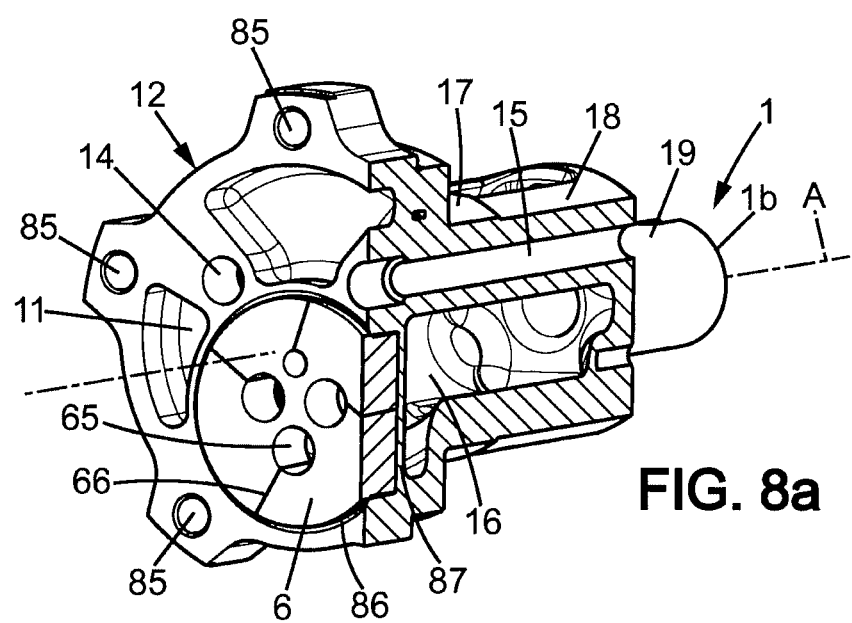
FIGS. 8A, 8B and 8C show the stub-axle support in greater detail.
Figure 8B:
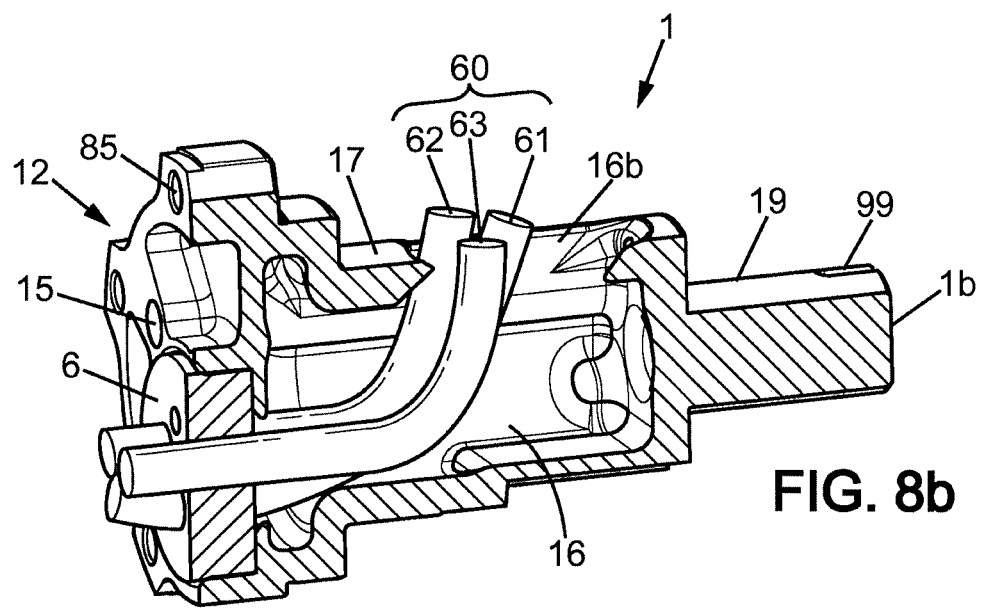
Figure 8C:
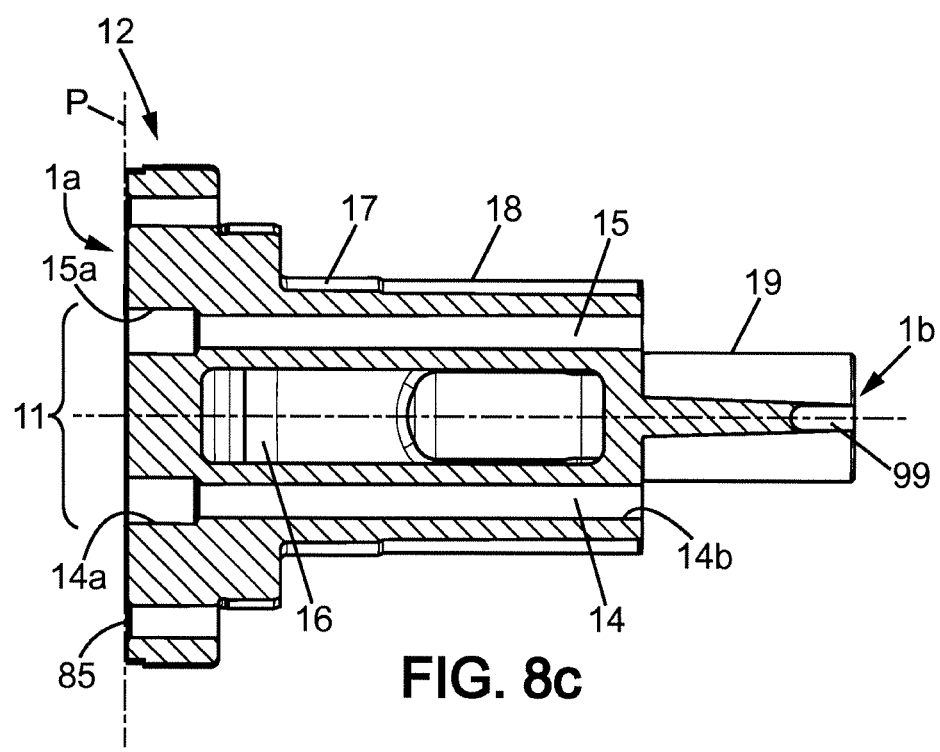

The passage 16 is preferably obtained by casting and the radial outlet 16b has inclined edges, e.g. substantially 45°, to facilitate the passage of the cables (FIG. 8b).

The annular element of coils 24 is generally shifted outwardly in relation to the stub-axle support 1. In other words, the annular element of coils 24 is arranged so as to be at an average axial position 25M further from the stub-axle support 1 than the average axial position 20M of the bearing 20 bearing on the stub-axle support (FIG. 6), in order to be able to house the brake disk and the corresponding caliper in the vicinity of the mounting flange (FIG. 4).

Figure 4:
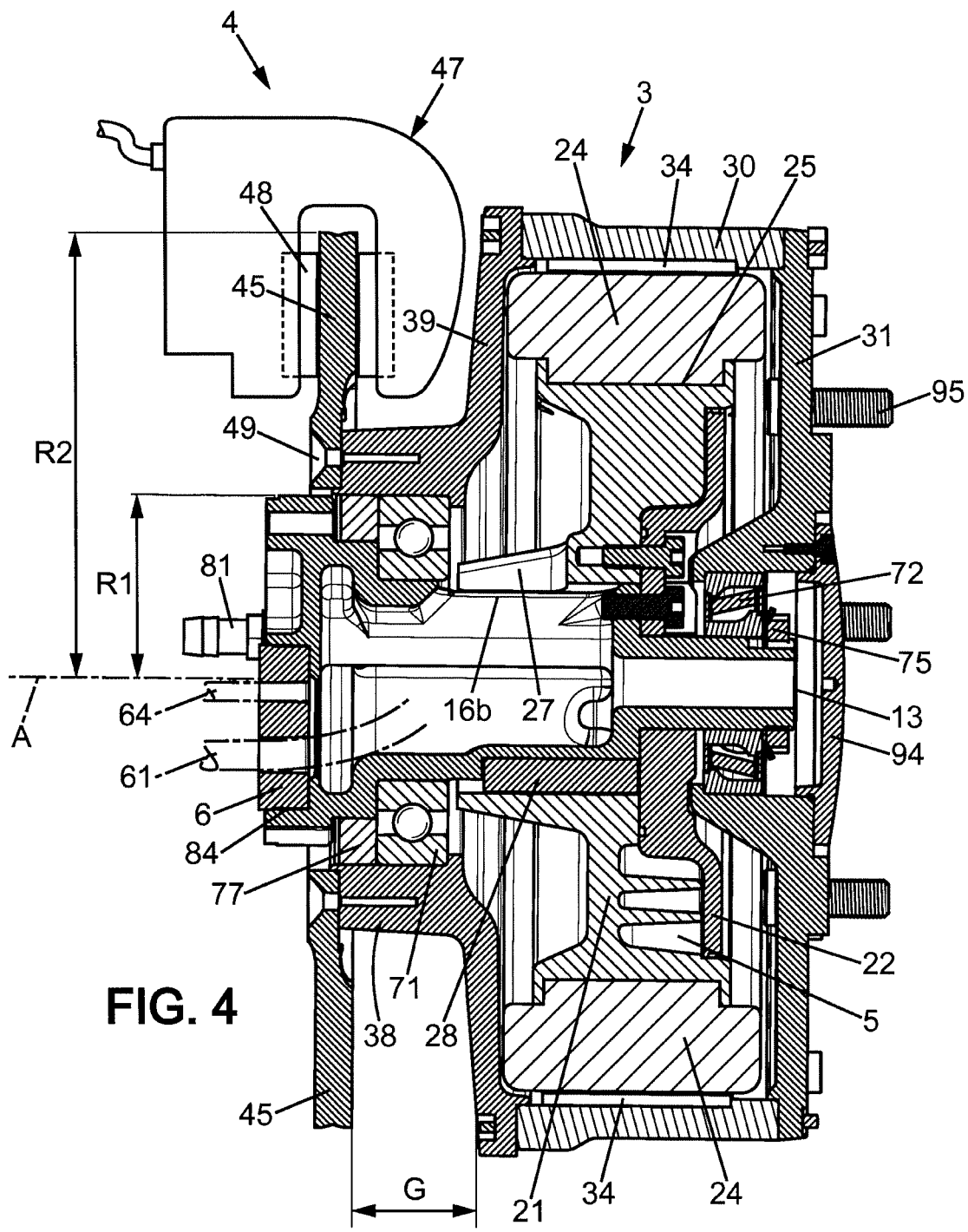
FIG. 4 shows an axial cross section of the traction-braking device.
Figure 5:
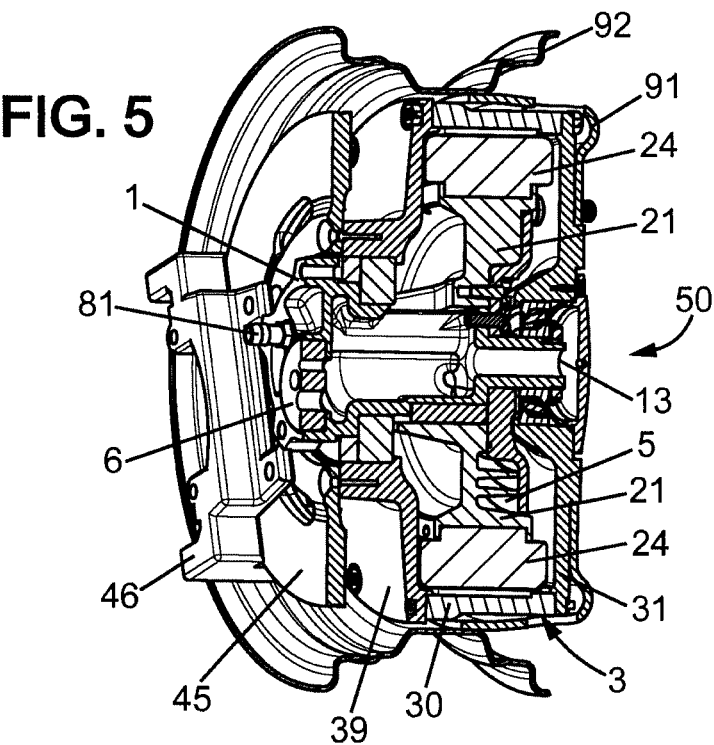
FIG. 5 is a perspective view of an axial cross section of the traction-braking device, with the wheel rim.
Figure 6:
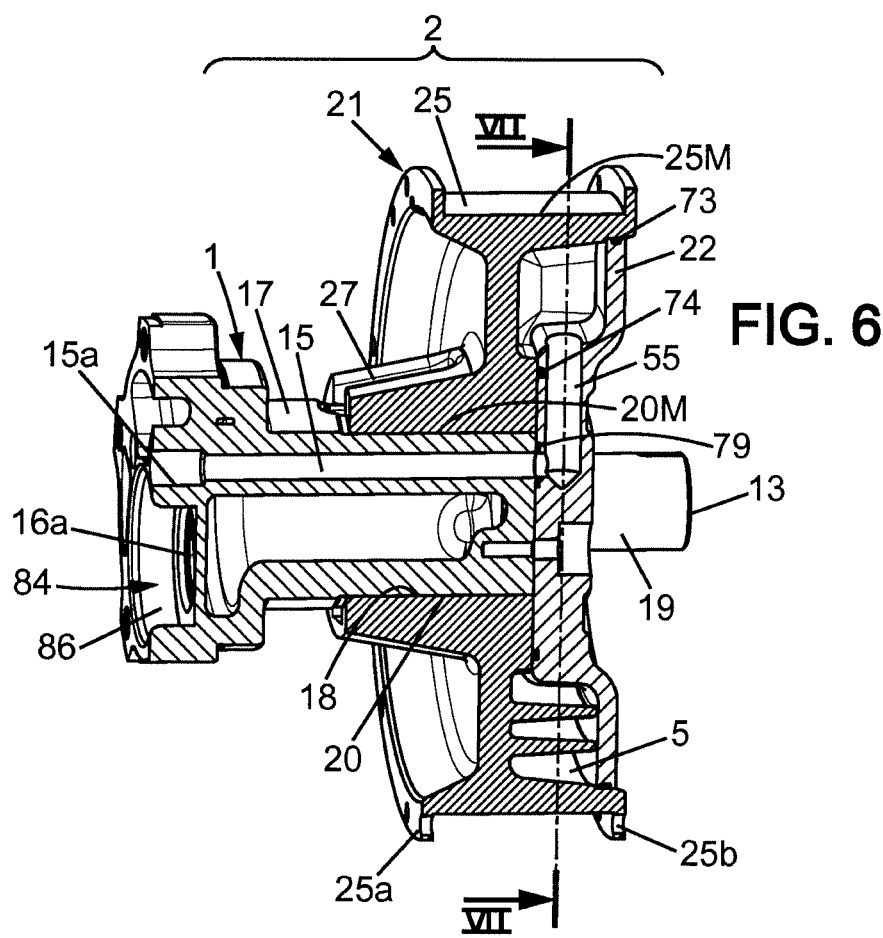
FIG. 6 shows a partial cutaway view of the stator assembly, along the cutting line VI-VI shown in FIG. 7.
Figure 7:
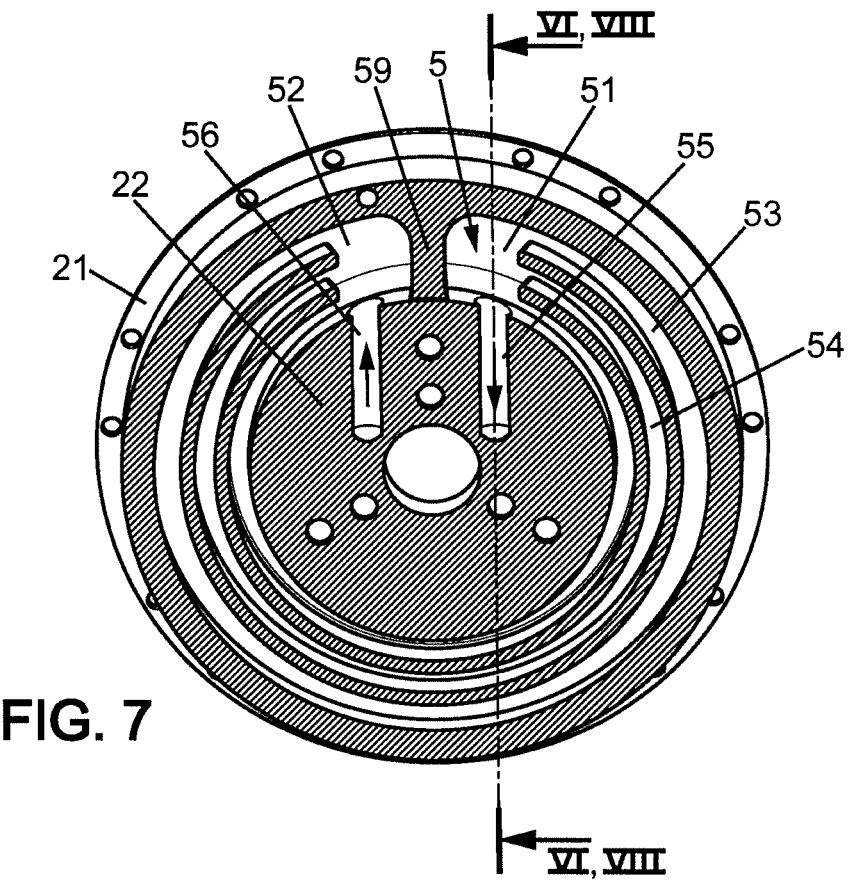
FIG. 7 illustrates the liquid cooling chamber.

Given this offset, a recess 27 is provided in the inner bearing 20 which is located opposite and in prolongation of the outlet 16b the cable passage (FIGS. 2 and 4).

Cooling System

The supply pipe 14 of the stub-axle support is connected on the vehicle side via a fluid connection 81 screwed into the threaded mouth 14a of the passage 14.

In this first embodiment, the bore 14 is a through-hole and opens in a blind hole 56 made in the stator cover 22, and which opens into an inlet portion 52 of the cooling chamber. Several channels connect the inlet portion to an outlet portion 51 in which opens another blind hole 55 formed in the cover, parallel to the first but offset in a transverse plane, which joins the second return line 15.

A separating partition 59 hermetically separates the inlet portion 52 from the outlet portion 51.

The heat exchange channels 53, 54, in a circular arc, are arranged concentrically; they are arranged hydraulically in parallel in the example shown; they might as well be arranged hydraulically in series in the manner of a labyrinth.

Seals 73, 74 (FIG. 9) are provided that prevent the leakage of liquid from the cooling chamber 5 to the electrical element of the stator. There is also an O-ring 79 at the interface between each of the hydraulic channels 14, 15 and the cover.

Assembly

The stub-axle support 1 features a first cylindrical seating 17 to receive a first bearing 71, an intermediate seating 18 to receive the bearing 20 of the stator body 21, with locking in rotation by a key 28, a second cylindrical seating 19 for a second bearing 72, with the diameters decreasing from the securing base to the end 1b. To facilitate the assembly, the following elements are mounted on the stub-axle support:
- firstly, a protective friction-reducing seal 77,
- then the first bearing 71 (here, this is a standard high-strength ball bearing),
- then the inner disk 39 of the rotor is mounted, the neck 38 of the inner disk 39 of the rotor being mounted on the first bearing 71,
- then the key 28 and the body of the stator 21 equipped with the annular element of coils 24 and the cover 22 comprising seals are mounted,
- then the cylindrical central portion 30 with the permanent magnets, and the central part that is secured to the inner disk 39,
- then the outer disk 31 of the rotor that is secured to the central portion 30 of the rotor,
- then the second bearing 72, here an angular contact ball bearing, to withstand axial clamping, and the transversal forces supported by the wheel (i.e. along the axis A),
- then the clamping nut 75 with lock washer, and finally, the cap 94 with an O-ring 78.

The second bearing 72 axially immobilizes the outer disk 31 of the rotor by means of an inner flange 36 formed in the central hub of the external disk.

It should be noted that the first bearing 71 and/or the second bearing 72 may alternatively be tapered roller bearings.

A groove 99 formed in an end of the second cylindrical bearing 19 makes it possible to receive a latch of the lock washer of the clamping nut 75.

Split Seal

The braking system 4 generates particles torn away from the friction material of the brake pads 48, these particles are polluting and can accumulate in unwanted locations. To prevent particles from entering the traction-braking device 50, the inside volume bounded by the rotor 3 is advantageously isolated from the outside environment, particularly with respect to the braking system 4.

Firstly a contact seal 77, already mentioned, is placed next to the first bearing 71. A lip seal or a double lip may be used, but a low-friction contact seal is retained.

Furthermore, a seal 6 forming a gland is placed to seal off the passage of the electrical cables 61, 62, 63, at the level of the securing base 12. More precisely, a seal 6 made of elastomeric material is chosen, for example silicone, in a general low-profile cylindrical shape H2 (flat shape) with an outer peripheral edge 67.

The seal comprises cylindrical passage orifices 65, having the same axis as the general axis of the seal (parallel to A), an opening for passing each of the electrical cables 61, 62, 63. It should be noted that the fluid pipes can also be passed through said orifices. Consequently, the generic term 'conductor' can be used to designate electric cables and hydraulic lines.

For each hole 65, a radial slot 66 connects the passage orifice to the peripheral edge 67, to allow the conductor to be fitted (cable or pipe) from the outer edge to the passage orifice.

Figure 9:
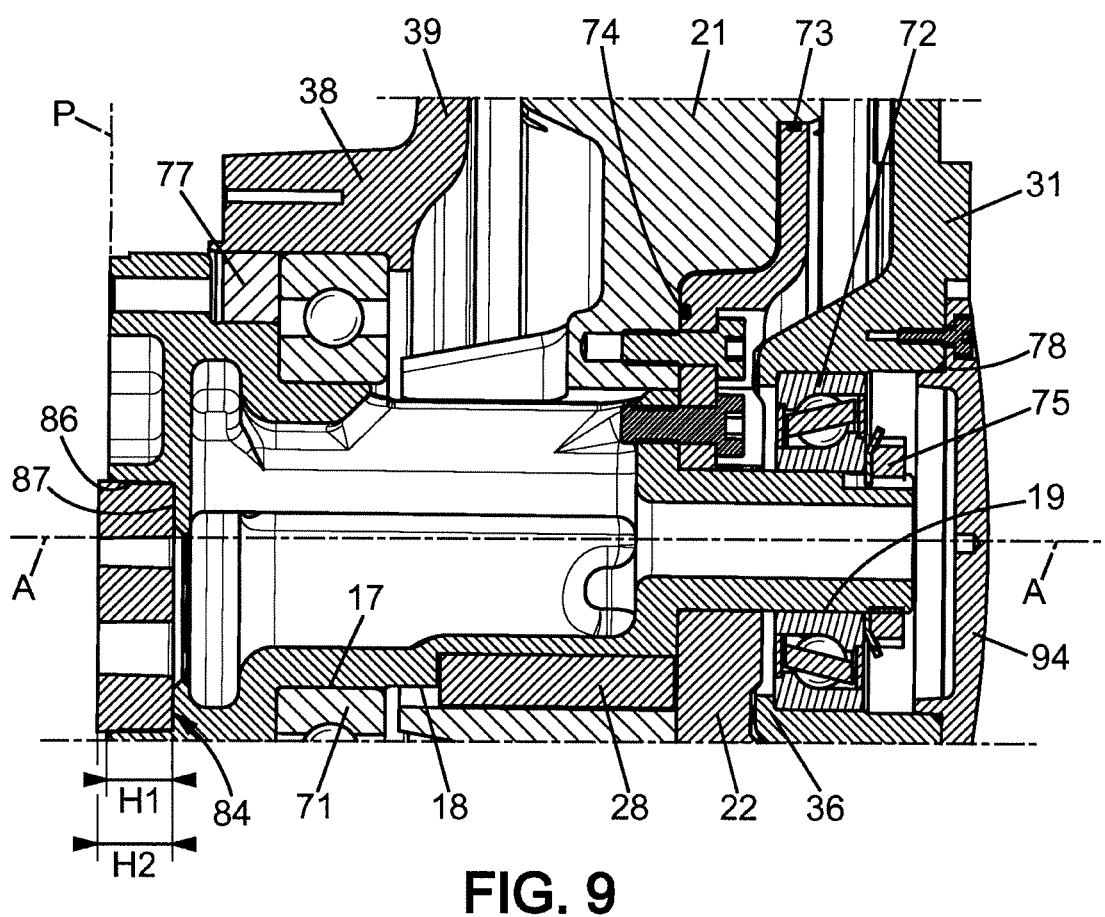
FIG. 9 illustrates the bearing and sealing functions.

The seal 6 is received in a cup-shaped recess 84 of height H1 less than the height of the seal, so that at rest, the seal 6 extends beyond the interface plane P of the securing base (see FIGS. 8A, 8B and 9).

The bottom 87 of the receiving recess is hollowed out opposite the orifices 65 of the seal to allow the conductors to pass beyond the bottom of the recess.

When the stub-axle support 1 is secured to the strut 8, the surfaces of the strut 8 in the vicinity of the seal compress the seal 6 in the axial direction A.

This results in compression intended to exert a pressure deforming the seal. This compression clamps the conductors 60 or even, beforehand, reduces the cross section of the orifices 65, on the one hand, and presses the outer edge 67 against the bottom and/or the edge 86 of the recess, on the other hand. In addition, this compression also hermetically seals the radical slots 66, so as to ensure a sealed gland-type passage.

Advantageously, this solution allows the assembly to be disassembled and reassembled for maintenance purposes.

In the example shown, as the seal 6 has significant flexibility, it is not necessary to provide an assembly clearance in the resting (uncompressed) state; however, the compression mentioned above also allows a small amount of play to be taken up which would be required to fit the seal itself in the recess and/or the conductors in the orifices. In other words, the seal 6 at rest may have an outside diameter either slightly less or identical, or either identical or slightly greater than the diameter of the inner edge 86 of the recess.

In the example shown, at rest the excess is in the order of 2 mm for a seal thickness (height of the cylinder H2) of 16 mm, and a recess depth H1 of 14 mm.

In the example shown in FIGS. 4-10, the split seal 6 has three large diameter openings 65 for the power cables 61, 62, 63 of the three phases of the electric motor and a hole 68 of smaller size for a multiconductor cable 64 for connecting one or several sensors to the control computer.

When assembling the stub-axle support 1 on the strut 8, compression is exerted on the area 69 marked by the thin hash marks in FIG. 10, which has a relatively large surface area with respect to the surface of the seal and allows the slots to be properly closed and to firmly compress the conductors in the holes 65, 68.

Variants

Alternatively, not shown in the figures, the outlet 16b is located on the outside of the body of the stator 21, and the cooling chamber is arranged on the inside of the body of the stator; in other words, it is reversed in relation to the preceding case, the positions of the electrical equipment (notably connections) and of the cooling chamber in relation to the body of the stator.

In this case and unlike the previous case, the cover defining the cooling chamber is arranged on the inside of the body of the stator, i.e. arranged axially between the body of the stator 21 and the securing base.

In this variant, the outside outlets of the two hydraulic lines are also oriented radially and enter directly into the internal channels of the cooling chamber obtained through casting in the cover or in the body of the stator; in this case, the holes 14, 15 are non-through holes, each hole bottom opening into a blind channel directed radially towards the outside.

Concerning the passage 16 for the electric cables 60, as the radial outlet is further from the securing base, this makes it possible to arrange the cable 60 with less curvature.

According to another variant not represented, the holes 14, 15 are non-through holes and both open into a blind channel, but these two blind holes are at axially offset positions. Two partial or total radial grooves are formed opposite each other in the cover or in the body of the stator, each being opposite a corresponding blind channel.

The invention claimed is:

1. A traction-braking device for a motorized wheel of an electric vehicle having a stator assembly and a rotor arranged on an outside of the stator assembly, the traction-braking device comprising:
   a stub-axle support, the stub-axle support comprising a securing base for connecting the traction-braking device to the vehicle, wherein the stub-axle support fixedly supports the stator assembly and rotationally supports the rotor and the motorized wheel;
   at least three axial passages, for two fluid pipes and for a passage of cables, each of the at least three axial passages opening into a central zone of the securing base, whereby the stator assembly is capable of connecting with a remaining portion of the vehicle for electric control and liquid cooling functions, wherein an axis of rotation of the motorized wheel crosses at least one axial passage out of the at least three axial passages; and
   a brake disk rotating as one with the rotor, the brake disk being arranged closer to the securing base to the vehicle than the stator assembly and the rotor, the brake disk being separated from the rotor by a space available to accommodate at least one brake caliper,
   wherein the stub-axle support is radially delimited by a first seating for a first bearing, an intermediate seating to receive a stator body, and a second seating for a second bearing, and
   wherein the first seating, the intermediate seating, and the second seating are disposed on the outside of the stub-axle support.

2. The traction-braking device as claimed in claim 1, in which the stub-axle support has a free end at an opposite of the securing base, wherein diameters of the first seating, the intermediate seating, and the second seating decrease from the securing base to the free end at the opposite of the securing base.

3. The traction-braking device as claimed in claim 2, in which the passage of cables opens radially in a space adjacent to the stator body.

4. The traction-braking device as claimed in claim 1, wherein the passage of cables opens axially at the opposite end of the securing base.

5. The traction-braking device as claimed in claim 1, wherein the two axial passages for the two fluid pipes are formed by holes parallel to the main axis of the stub-axle support.

6. The traction-braking device as claimed in claim 1, in which the stator assembly comprises the stator body and a cover defining a cooling chamber.

7. The traction-braking device as claimed in claim 6, in which the stator body includes an internal cylindrical bearing centered on the main axis, the internal cylindrical bearing having an average axial position, and in which the stator assembly comprises an annular element of coils arranged so as to be at an average axial position further from the securing base of the stub-axle support than the average axial position of the internal cylindrical bearing which bears on the stub-axle support.

8. The traction-braking device as claimed in claim 6, in which the cover defining the cooling chamber is arranged on the outside of the stator body, on a side of a free end of stub-axle support.

9. The traction-braking device as claimed in claim 6, in which the cover defining the cooling chamber is arranged on an inside of the stator body, axially between the stator body and the securing base.

10. The traction-braking device as claimed in claim 1, wherein the traction-braking device is circumscribed within an internal volume of a 14-inch wheel rim.

11. The traction-braking device as claimed in claim 1, in which the rotor is formed as an assembly of a cylindrical central part bearing permanent magnets, an outer disk on which can be secured a wheel rim and an inner disk with neck on which the brake disk is secured.

12. The traction-braking device as claimed in claim 1, in which an interior space defined by the rotor is isolated from an external environment by seals.

* * * * *